No. 855,438. PATENTED MAY 28, 1907

J. V. EBEL.
MACHINE FOR MANUFACTURING MACARONI, &c.
APPLICATION FILED SEPT. 17, 1904. RENEWED NOV. 6, 1906.

3 SHEETS—SHEET 1.

WITNESSES:
J. P. Appleman,
H. W. Stevenson,

INVENTOR
John V. Ebel
by J. H. Stevenson

ATTORNEY

No. 855,438. PATENTED MAY 28, 1907.
J. V. EBEL.
MACHINE FOR MANUFACTURING MACARONI, &c.
APPLICATION FILED SEPT. 17, 1904. RENEWED NOV. 6, 1906.

3 SHEETS—SHEET 2.

WITNESSES:
J. P. Appleman
H. W. Stevenson

INVENTOR
John V. Ebel
by J. H. Stevenson
ATTORNEY

No. 855,438. PATENTED MAY 28, 1907.
J. V. EBEL.
MACHINE FOR MANUFACTURING MACARONI, &c.
APPLICATION FILED SEPT. 17, 1904. RENEWED NOV. 6, 1906.
3 SHEETS—SHEET 3.
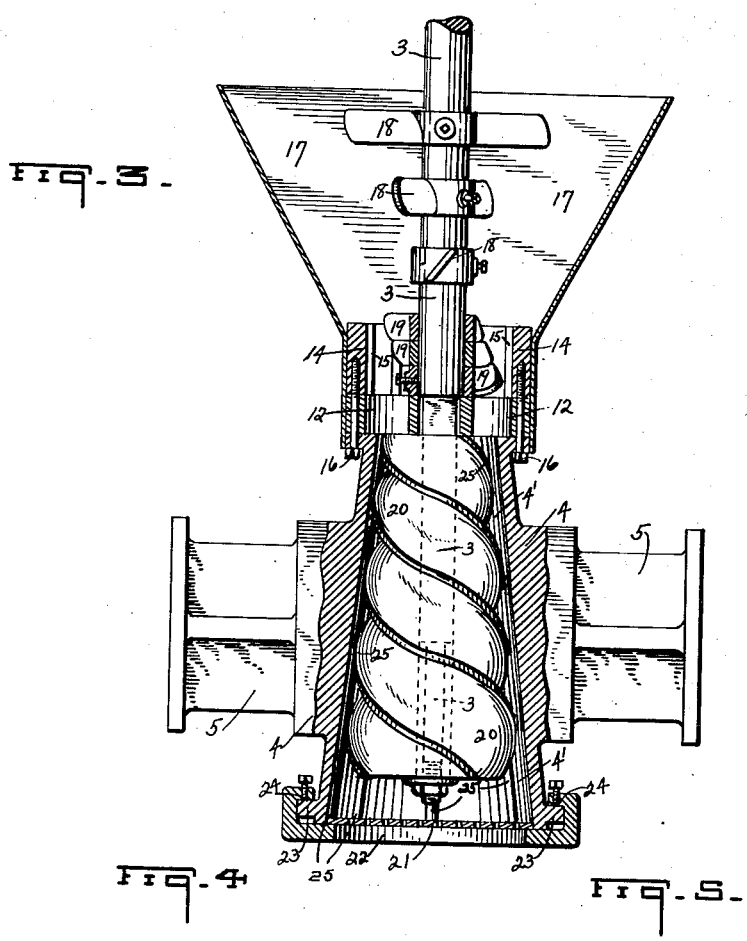
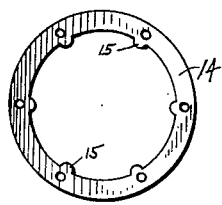
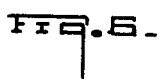
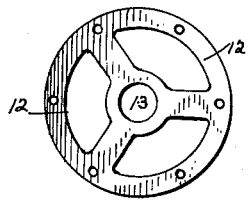
WITNESSES:
J. P. Appleman,
H. W. Stevenson
INVENTOR
John V. Ebel
by J. H. Stevenson
ATTORNEY

UNITED STATES PATENT OFFICE.

JOHN V. EBEL, OF PITTSBURG, PENNSYLVANIA.

MACHINE FOR MANUFACTURING MACARONI, &c.

No. 855,438.                    Specification of Letters Patent.                    Patented May 28, 1907.

Application filed September 17, 1904. Renewed November 6, 1906. Serial No. 342,293.

*To all whom it may concern:*

Be it known that I, JOHN V. EBEL, a citizen of the United States, residing at Pittsburg, in the county of Allegheny and State of Pennsylvania, have invented certain new and useful Improvements in Machines for Manufacturing Macaroni, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a new and useful machine for manufacturing macaroni, noodles, or other doughy products, and is especially designed and constructed with a view of combining a mixing, kneading and pressing machine in one, thereby effecting a material saving in the original cost of such necessary machinery and, at the same time, simplifying the method of forming such doughy products and cheapening the cost of production.

Figure 1:
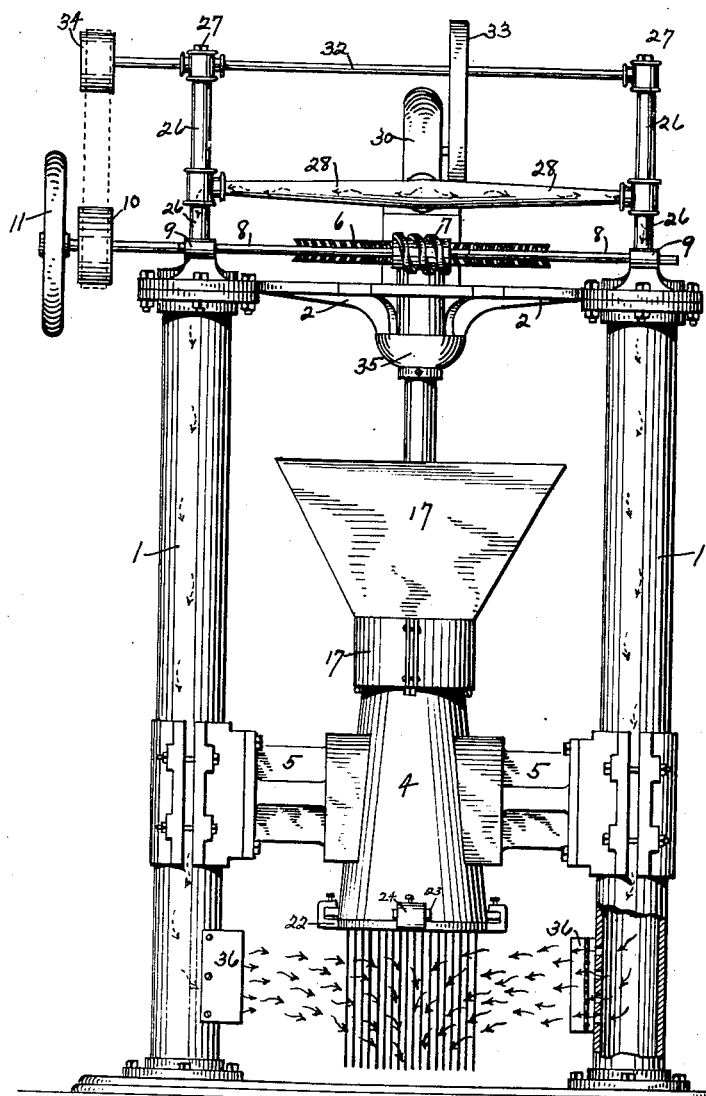
Figure 2:
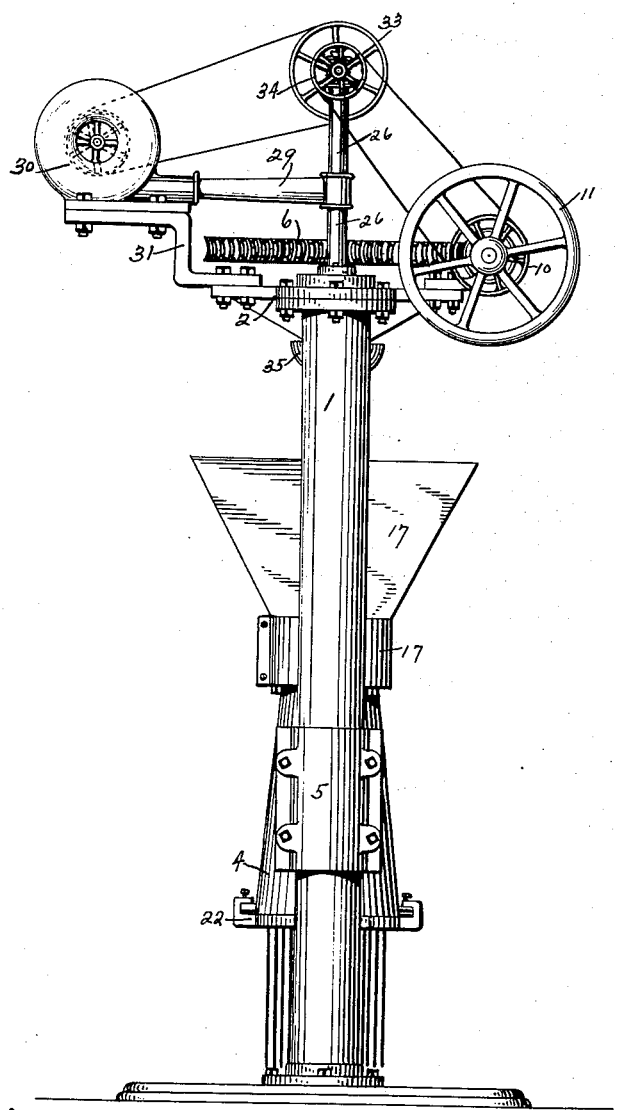

In the accompanying drawings, forming a part of this specification, I have illustrated my invention by several views, in which:

Figure 1, Sheet 1, is a front elevation of my improved machine showing the method employed for drying the products of said machine, as it emerges from the pressing chamber. Fig. 2, Sheet 2, is a side view of the same showing the means employed for a forced draft used in drying the products of my machine. Fig. 3, Sheet 3, is a vertical sectional view of the mixing, kneading, and pressing compartments, and the means, attached to a revolving shaft, for forcing the dough from one compartment into another, and thence out through the forming die. Fig. 4 is a plan view of the casting forming the kneading compartment. Fig. 5 is a similar view of the casting through which the dough is forced from the kneading into the pressing chamber. Fig. 6 is a view of the keeper used in supporting the forming die.

Numerals of reference designate like parts throughout the several views, in which: The numeral 1 represents hollow upright supports, two in number, to the tops of which is secured a center bearing casting 2. Suspended through this casting 2, midway between the supporting columns 1—1, is a revolving shaft 3 which extends down nearly to the bottom of a hollow casting 4, forming the pressing chamber 4'; this latter chamber being slightly funnel shaped, with the smaller end up, and having the extension parts 5—5, the latter being securely bolted to the supporting columns 1—1. Secured to the top of this shaft 3 is a gear wheel 6, operated by a worm 7, secured to a revolving shaft 8. This shaft 8 is seated in suitable bearings 9—9 secured to the top of the center bearing casting 2, on the outer end being mounted a bandwheel 10 and fly wheel 11.

Seated on the top of the funnel shaped pressing chamber 4' is a casting 12 having a central opening 13, through which passes the shaft 3, and also having a series of openings surrounding the central opening through which the dough is forced from the kneading chamber into the pressing compartment 4'. Seated on the top of this casting 12 is a hollow casting 14, having a series of flutes or ribs 15 formed on the inside thereof. Suitable bolts 16 connect and secure these two circular castings, 12 and 14, to the hollow casting 4. A hopper or mixing chamber 17 is adapted to move up or down over the castings 12 and 14, or it may be entirely removed for cleaning purposes. Adjustably mounted on the shaft 3, inside this hopper 17, are a number of angled mixing blades 18—18, so arranged on the shaft with respect to each other that the dough will be thoroughly mixed and forced down into the kneading chamber. Also adjustably mounted on the shaft 3 are a number of angled kneading blades 19—19, designed to operate inside the casting 14 and thoroughly knead the dough before it is forced through the holes in the casting 12, and into the pressing chamber 4'.

Removably mounted on a square portion of the shaft 3, and inside the pressing chamber 4', is a tapered double worm, or pressing out screw 20, designed to squeeze and force the dough down through the chamber 4' and out through any suitable forming die 21. This die is loosely seated in an annular keeper 22, which is removably mounted over the lower end of the casting 4 and held in position by tapered lugs 23, formed integral with said latter casting, which engage slotted lugs 24 formed on the annular keeper 22. This will permit of the keeper 22 being readily taken off and the forming die removed for cleaning purposes, or of being replaced by another die.

The inside of the pressing chamber 4' is provided with vertical ribs or flutes 25, beginning at the top of the chamber and extending clear to the bottom of the same.

Mounted on the top of the hollow columns 1—1, and communicating with the inside thereof, are standard air pipes 26, in the tops of which are the plugs 27. Connected with these pipes 26 is an air blast pipe 28; this latter pipe in turn communicating with another air blast pipe 29 leading to the blast fan 30, seated on a suitable support 31 secured to the center bearing casting 2.

Operatively seated in the tops of the standard air pipes 26 is a revolving shaft 32 on which is mounted a pulley 33, the latter being connected by a belt with the wheel driving the fan. A pulley wheel 34, mounted on the outer end of the shaft 32, is connected by a belt with the wheel 10.

Seated around the shaft 3, under the center bearing casting 2, is a bell shaped oil cup or trap 35.

At the bottom of the supports 1—1 there is provided a series of openings, out through which a current of air passes, being directed against the macaroni or noodles by deflectors 36.

As soon as the dough, necessary for forming the macaroni or noodles, has been prepared, it is dumped into the hopper 17, where the angled mixing blades 18—18 immediately begin to stir up and thoroughly mix this partly prepared dough; and as it is forced on down into the narrow part of the hopper, it comes in contact with the angled kneading blades 19—19, which squeeze and thoroughly knead the dough preparatory to forcing it through the openings in the casting 12 and into the pressing out chamber 4'. As soon as the dough enters this compartment the double worm screw carries it down through this chamber and forces it out through the die 21.

When power is applied to my machine the connecting pulleys and belts will revolve the fan 30 and force a current of air through the pipes 29 and 28 into the hollow uprights 1—1. This blast of air coming from the openings in the lower part of the uprights, at both sides of the machine, will be directed against the macaroni or noodles, being forced through the forming die, by the deflectors 36, and by this method of premature drying the products of my machine can be more readily and quickly prepared for shipment. This cold air blast will also prevent the macaroni or noodles from sticking together, thus preserving their original form.

Having thus fully shown and described my invention, what I claim as new, and desire to secure by Letters Patent, is:

1. In a machine of the character described, the combination with a pair of hollow supporting columns of a driving means carried thereon, a compressing compartment provided with ribs therein, suspended between the columns, a shaft extending into the compressing compartment and operative through the driving means, an expressing member mounted on the lower end of said shaft, and means for directing an air blast against the macaroni or noodles as the same is expressed from the compressing compartment, substantially as described.

2. In a machine of the type set forth, the combination of hollow supporting columns having openings near the base thereof, a pressing compartment mounted between the columns provided with a die mounted in the bottom thereof, means for expressing the dough from said compartment, and means for forcing an air blast through the openings of the columns against the dough as the same is expressed from the pressing compartment, substantially as described.

3. In a machine for manufacturing macaroni, noodles, etc., the combination with a driving means of a pair of supporting columns, to the tops of which is secured a center bearing casting; a funnel shaped pressing compartment having vertically extended ribs therein suspended midway between the supporting columns; a perpendicular shaft seated in said center bearing casting and extending down nearly to the bottom of said pressing compartment; a wheel mounted on the top of said shaft; means, connected with said wheel, for revolving said shaft; an apertured casting seated on the top of the pressing compartment; a hollow casting, having a plurality of vertical ribs or flutes formed on the inner face thereof, removably mounted on said apertured casting and forming a kneading compartment; and an adjustable hopper or mixing chamber mounted over said latter casting; substantially as described.

4. In a machine for manufacturing macaroni, noodles, etc., the combination with a driving means of a pair of supporting columns, to the tops of which is secured a center bearing casting; a funnel shaped pressing compartment having vertical ribs formed therein suspended midway between the supporting columns; a perpendicular shaft seated in said center bearing casting and extending down nearly to the bottom of said pressing compartment; means, connected with said wheel, for revolving said shaft; an apertured casting seated on the top of the pressing compartment; a hollow casting, having a plurality of vertical ribs or flutes formed on the inner face thereof, removably mounted on said apertured casting and forming a kneading compartment; an adjustable hopper, or mixing chamber, mounted over said latter casting; a plurality of angled mixing blades adjustably mounted on the perpendicular shaft and designed to operate inside the mixing hopper; a plurality of angled kneading blades adjustably mounted on the perpendicular shaft and designed to operate inside the hollow kneading casting; a double worm screw removably secured to the lower part of the perpendicular shaft and designed to operate inside the pressing compartment; a die keeper adjustably secured to the bottom of the pressing compartment; and a suitable forming die seated in said keeper; substantially as described.

5. In a machine for manufacturing macaroni, noodles, etc., the combination with a driving means of a pair of hollow supporting columns, to the tops of which is secured a center bearing casting; a perpendicular shaft seated in said casting; a worm gear wheel mounted on the top of said shaft; a horizontal shaft mounted in suitable bearings fixed to the top of the supporting columns and designed to be connected with the driving means; a worm mounted on said latter shaft engaging the worm gear wheel; a pair of hollow standards secured to the tops of the supporting columns and communicating with the interior of the same; an air blast pipe connecting said hollow standards and communicating with a pipe leading to a blast fan secured to one side of the center bearing casting; means, mounted on the top of the standards, and connected with the driving means, for operating said fan; a plurality of air openings in the lower part of said hollow supporting columns; and means, connected with said columns, for deflecting the air blast against the products of the machine; substantially as described.

6. In a machine for manufacturing macaroni, noodles, etc., the combination with a driving means of a pair of hollow supporting columns, to the tops of which is secured a center bearing casting; a funnel shaped pressing compartment suspended midway between the supporting columns; a perpendicular shaft seated in said center bearing casting and extending down nearly to the bottom of said pressing compartment; a worm gear wheel mounted on the top of said shaft; a horizontal shaft mounted in suitable bearings fixed to the top of the supporting columns and designed to be connected with the driving means; a worm mounted on said latter shaft engaging the worm gear wheel; an apertured casting seated on the top of the pressing compartment; a hollow casting, having a plurality of vertical ribs or flutes formed on the inner face thereof, mounted on said apertured casting; an adjustable hopper or mixing chamber mounted over said latter casting; a plurality of angled mixing blades adjustably mounted on the perpendicular shaft and designed to operate inside the mixing hopper; a plurality of angled kneading blades adjustably mounted on said perpendicular shaft and designed to operate inside the hollow casting; a double worm screw adjustably secured to the lower part of the perpendicular shaft and designed to operate inside the pressing compartment; a die keeper adjustably secured to the bottom of the pressing compartment; a suitable forming die seated in said keeper; a pair of hollow standards secured to the tops of the supporting columns and communicating with the interior of the same; an air blast pipe connecting said hollow standards and communicating with a pipe leading to a blast fan secured to one side of the center bearing casting; means, mounted on the top of the standards, and connected with the driving means, for operating said fan; a plurality of air openings in the lower part of said hollow supporting columns; and means, connected with said columns, for deflecting the air blast against the products of the machine; substantially as described.

7. In a machine for the manufacture of macaroni, noodles and the like, a mixing chamber, a kneading compartment, a pressing chamber having a die removably secured to the lower end thereof, a shaft extending through said chamber provided with mixing plates and having a pressing member mounted at the lower end thereof, a driving means for said shaft, hollow supporting members provided with openings in their lower portions adjacent to the lower end of the pressing chamber, means for supplying an air blast to said columns, and means carried adjacent to said openings for directing an air blast against the macaroni as it is expressed from the pressing chamber, substantially as described.

In testimony whereof, I affix my signature, in presence of two witnesses.

JOHN V. EBEL.

Witnesses:
B. L. SUCCOP,
A. L. FLOTO.